United States Patent
Uehara et al.

(10) Patent No.: US 7,367,614 B2
(45) Date of Patent: May 6, 2008

(54) MULTI-PANEL SUNSHADE DEVICE

(75) Inventors: Tatsuaki Uehara, Tochigi-ken (JP); Teruyuki Nakamura, Tochigi-ken (JP)

(73) Assignee: Yachiyo Kogyo Kabushiki Kaisya, Saitama-Ken (JP)

( * ) Notice: Subject to any disclaimer, the term of this patent is extended or adjusted under 35 U.S.C. 154(b) by 0 days.

(21) Appl. No.: 11/639,886

(22) Filed: Dec. 15, 2006

(65) Prior Publication Data
US 2007/0145785 A1 Jun. 28, 2007

(51) Int. Cl.
*B60J 7/00* (2006.01)
(52) U.S. Cl. .................................................. 296/214
(58) Field of Classification Search ................. 296/214
See application file for complete search history.

(56) References Cited
U.S. PATENT DOCUMENTS 5,951,100 A * 9/1999 Ewing et al. ................ 296/214
6,726,275 B2 * 4/2004 Hendricus Schrans ...... 296/214
2007/0085384 A1 * 4/2007 Van De Logt .............. 296/214

* cited by examiner

Primary Examiner—Dennis H Pedder
(74) Attorney, Agent, or Firm—Lumen Patent Firm, Inc.

(57) ABSTRACT

In a multi-panel sunshade device for a vehicle comprising a drive panel and a plurality of follower panels slidably supported between the right and left guide rails to selectively open and close the roof opening, the right and left guide rails each comprises an upper guide rail and a lower guide rail, and right and left front slide shoes of each follower panel are supported by the right and left upper guide rails, respectively, while right and left rear slide shoes of each follower panel are supported by the right and left lower guide rails, respectively. Further, a pair of right and left front slide shoe storing rooms are connected to the right and left upper guide rails, respectively, and a pair of right and left rear slide shoe storing rooms are connected to the right and left lower guide rails, respectively.

12 Claims, 10 Drawing Sheets

MULTI-PANEL SUNSHADE DEVICE

CROSS-REFERENCE TO RELATED APPLICATIONS

This application claims priority from Japanese Patent Application No. 2005-375114, filed Dec. 27, 2005, Japanese Patent Application No. 2006-225146, filed Aug. 22, 2006, and Japanese Patent Application No. 2006-225147, filed Aug. 22, 2006, all of which are incorporated herein by reference. Also, the contents of a co-pending application based upon Japanese Patent Application Nos. 2005-374843, 2006-57445, 2006-179881, 2006-184451 and 2006-272599 are incorporated herein by reference.

FIELD OF THE INVENTION

The present invention relates to a multi-panel sunshade device comprising a plurality of sunshade panels for selectively opening and closing an opening defined in a vehicle roof, where the sunshade panels are stacked one over the other in a fully open position and arranged one next to the other in a same plane in a fully closed position.

BACKGROUND

Conventionally, it is known to constitute part of a roof of an automobile with a glass panel to give an open-air feel to the passenger compartment. Some of such automobiles with the so-called glass sunroof are provided with a plurality of sunshade panels that are slidable in the fore-and-aft direction of the vehicle beneath the glass panel to control the amount of sunlight entering the passenger compartment.

An exemplary one of such sunshade devices comprises three sunshade panels, where the right and left side edges of each panel are supported by a corresponding one of three pairs of guide rails positioned at different heights, and an engagement and disengagement mechanism is provided between end portions of fore-and-aft adjoining panels so that the three panels can be selectively closed and opened in a manner similar to a double sliding door by driving the forefront sunshade panel forwardly and rearwardly (see Japanese Patent Application Laid-Open (kokai) No. 2004-249851, for example).

In this conventional sunshade device, a step is formed between fore-and-aft adjoining panels in the fully closed state due to the difference in height of the panel positions, whereby deteriorating the appearance. Further, this device uses the three guide rail pairs for slidably guiding the three individual panels, and this makes it difficult to simultaneously achieve both of reduction in the total vehicle height and increase in the headroom of the passenger compartment because the sunshade device requires an amount of accumulated thickness of the three guide rail pairs over an entire length of the movable range of the forefront panel.

In order to deal with such a problem, it is proposed in Japanese Patent Application Laid-Open (kokai) No. 5-24437 to provide a sunshade device having front and rear sunshade panels which are slidably supported by the same guide rail pair.

In the sunshade device disclosed in JPA No. 5-24437, the front and rear sunshade panels are stored in a rear portion of the vehicle with the front panel being stacked over the rear panel in a fully open state, and the sunshade panels are drawn out in the forward direction to fully close the roof opening. In order to achieve this, a power source is connected to the front panel to drive the front panel, and the rear panel is selectively linked to the front panel to follow the move of the front panel.

In JPA No. 5-24437, the linkage mechanism for linking the sunshade panels comprises a projection provided to a rear end portion of the front panel (drive panel) and a hole defined in a front end portion of the rear panel (follower panel) so that the projection of the front panel can engage the hole of the rear panel to link these sunshade panels. It should be noted that the number of the follower panels can be more than one and in such a case, adjoining follower panels can be linked to each other so that one panel can follow the other (see Japanese Patent Application Laid-Open No. 62-68126, for example).

In the fully open state, the panels are stacked together in a stored state to provide a wide opening. In order to achieve the stacking of the front and rear panels in the stored state, in JPA No. 5-24437, each sunshade panel is provided with a pair of right and left front slide shoes (sliders) and a pair of right and left rear slide shoes, and these slide shoes are slidably received by the corresponding one of the pair of right and left guide rails. Further, each guide rail is formed with a front opening and a rear opening in its rear portion so that when the front slide shoe and the rear slide shoe of the rear sunshade panel are aligned with the front opening and the rear opening of the guide rail, respectively, the front and rear slide shoes of the rear panel can be pushed downward through the front and rear opening of the guide rail against an upward urging means (spring) into the respective slide shoe storing rooms to whereby move the rear panel down to the stored position which is provided below the rear portion of the guide rails. The force for pushing down the rear panel against the spring force is provided by the rearwardly driven front panel overriding the rear panel.

In JPA No. 5-24437, the front and rear slide shoes of each panel are received by the same guide rail (i.e., the left front and rear slide shoes are received by the left guide rail while the right front and rear slide shoes are received by the right guide rail), and this can create a problem that the rear slide shoe of the rear panel can inadvertently fall into the front opening formed in each guide rail. In order to solve such a problem, in JPA No. 5-24437, the front opening of the guide rail is provided with a shorter length than the rear opening and correspondingly, the front slide shoe of the rear panel is provided with a shorter length than the rear slide shoe. However, this still cannot completely eliminate the possibility that the movement of the rear slide shoe can be unfavorably interfered by the front opening of the guide rail and thus the sliding move of the rear slide panel can be hindered when there are oscillations or the like during travel of the vehicle.

Further, in the above sunshade device, it is desired to ensure that the slide shoes can be stored into the corresponding slide shoe storing rooms smoothly and reliably without requiring complicated structure therefor.

SUMMARY OF THE INVENTION

In view of such problems of the prior art, a primary object of the present invention is to provide a multi-panel sunshade device for a vehicle comprising a plurality of sunshade panels, which has a smaller thickness to achieve both a smaller total height of the vehicle and increase in the head clearance while ensuring smooth sliding movement of the sunshade panels.

According to the present invention, there is provided a multi-panel sunshade device for selectively opening and closing an opening defined in a roof of a vehicle, comprising: a pair of right and left guide rails extending along either side of the roof opening, the guide rails each having a front end and a rear end; a plurality of sunshade panels slidably supported between the pair of right and left guide rails, the plurality of sunshade panels comprising a drive panel that is driven by a power source and at least one follower panel that can be caused to move by movement of the drive panel; and a panel storage room provided in a rear end portion of the right and left guide rails to store the plurality of sunshade panels in a stacked state when the sunshade panels are in a fully open position; and a panel linkage mechanism provided between adjacent sunshade panels for linking the adjacent sunshade panels to each other when the plurality of sunshade panels are slidably moved forward from the fully open position to a fully closed position where the plurality of sunshade panels are arranged one next to the other along the guide rails to form a substantially flat inner surface, wherein the drive panel consists of a forefront one of the sunshade panels that is positioned most distant from the panel storage room when the plurality of sunshade panels are in the fully closed position, and in the fully open position, the plurality of sunshade panels are stacked with the forefront sunshade panel being positioned at a bottom and a rearmost sunshade panel being at a top, wherein each of the plurality of sunshade panels are provided with a pair of right and left front slide shoes and a pair of right and left rear slide shoes, and wherein each of the pair of right and left guide rails comprises an upper guide rail and a lower guide rail and the right and left front slide shoes of the at least one follower panel are supported by the right and left upper guide rails, respectively, while the right and left rear slide shoes of the at least one follower panel are supported by the right and left lower guide rails, respectively, the multi-panel sunshade device further comprising: a pair of right and left front slide shoe storing rooms connected to the right and left upper guide rails, respectively, so that the right and left front slide shoes of the at least one follower panel can move between the right and left upper guide rails and the right and left front slide shoe storing rooms, respectively; and a pair of right and left rear slide shoe storing rooms connected to the right and left lower guide rails, respectively, so that the right and left rear slide shoes of the at least one follower panel can move between the right and left lower guide rails and the right and left rear slide shoe storing rooms, respectively.

According to the above structure, only two pairs of guide rails (i.e., upper guide rail pair and lower guide rail pair) are required to slidably guide a plurality of sunshade panels (e.g., three or more) to move between the fully closed state and the fully open state, and thus reducing the thickness of substantial part of the sunshade device. This contributes to achieving both reduction in the total height of the vehicle and increase in the head clearance. Further, because the front slide shoe storing room and the rear slide shoe storing room are connected to different guide rails, it is prevented that the rear slide shoe of the follower panel may inadvertently enter the front slide shoe storing room and thus smooth movements of the slide shoes along the guide rails can be ensured.

Preferably, each of the right and left rear slide shoe storing rooms is connected to a rear end of the corresponding lower guide rail. This contributes to facilitating the movements of the rear slide shoes between the lower guide rails and the rear slide shoe storing rooms.

The multi-panel sunshade device of the present invention preferably comprises a stopper member for, when each of the right and left front slide shoes of the at least one follower panel reaches an entrance to the corresponding front slide shoe storing room in a sunshade opening operation, preventing further sliding movement of the front slide shoes of the at least one follower panel. This ensures that the front slide shoes enter the front slide shoe storing rooms without passing the entrance to the front slide shoe storing rooms in the sunshade opening operation.

Further preferably, each of the right and left front slide shoe storing rooms is connected to a rear end of the corresponding upper guide rail. This can facilitate the movements of the front slide shoes between the upper guide rails and the front slide shoe storing rooms. More particularly, a rear wall of each of the right and left front slide shoe storing rooms can preferably serve as the stopper.

In one preferred embodiment, the pair of right and left rear slide shoe storing rooms extend obliquely upward in a rearward direction from the rear end of the right and left lower guide rails, respectively. This allows for smooth entering and exiting of the rear slide shoes into and out of the rear slide shoe storing rooms.

Preferably, a distance between the front slide shoes and the rear slide shoes of each follower panel is greater than a distance between entrances to the front slide shoe storing rooms and entrances to the rear shoe storing rooms, whereby when the right and left front slide shoes of each follower panel reach the entrances to the corresponding front slide shoe storing rooms in a sunshade opening operation, the right and left rear slide shoes of the follower panel have entered into the corresponding rear slide shoe storing rooms. In this way, in the sunshade opening operation, the rear slide shoes are first stored into the rear slide shoe storing rooms and thereafter the front slide shoes are stored into the front slide shoe storing rooms, and thus, the storing of the front and rear slide shoes can be carried out in order and reliably.

In order to allow the rear slide shoe to first enter the obliquely extending rear slide shoe storing rooms, it is preferred that the right and left front slide shoes of each follower panel are slidably supported by the corresponding upper guide rails with such a play that allows each follower sunshade panel to pivot around the front slide shoes when the right and left rear slide shoes enter the corresponding rear slide shoe storing rooms while the right and left front slide shoes are still guided by the upper guide rails in the sunshade opening operation.

Further preferably, each front slide shoe storing room extends vertically upward from the corresponding upper guide rail, and different follower sunshade panels have different distances between the front and rear slide shoes. The vertically extending front slide shoe storing rooms can regulate the horizontal (lengthwise) movements of the front slide shoes of the follower panels in the stored state, to thereby prevent lengthwise rattling movements of the slide shoes.

The panel linkage mechanism preferably comprises a laterally extending pin provided to one of the adjacent sunshade panels and a cam slot provided to the other of the adjacent sunshade panels, the cam slot extending obliquely in the direction of sliding movements of the sunshade panels and having an open end, and wherein when the adjacent sunshade panels are arranged one next to the other along the guide rails, the pin of the one of the adjacent sunshade panels is received in the cam slot of the other of the adjacent sunshade panels, and when the adjacent sunshade panels are in the stacked state, the pin of the one of the adjacent sunshade panels is released from the open end of the cam slot of the other of the adjacent sunshade panels to allow the adjacent sunshade panels to slidably move relative to each other. In this way, the linkage between the adjoining panels can be achieved by the same linkage mechanism (pin and cam slot) both in the sunshade opening operation and in the sunshade closing operation, and thus the linkage mechanism can be simplified.

Further preferably, a part of an outer surface of the pin of the one of the adjacent sunshade panels that generally faces toward the cam slot of the other of the adjacent sunshade panels when the adjacent sunshade panels are in the stacked state is inclined with respect to a vertical direction when seen in a cross-section taken along a line parallel to the guide rails in such a manner that at least a portion of the pin has entered into the cam slot when the outer surface of the pin abuts an edge of the cam slot in a sunshade closing operation, wherein the inclined part of the outer surface of the pin extends in a vertical direction more than half of a height of the pin. In this way, it is ensured that the some portion of the pin protrudes into the cam slot when the inclined part of the outer surface of the pin contacts the edge of the cam slot in the sunshade closing operation, and this can contribute reliably guiding the pin into the cam slot to accomplish the engagement.

Preferably, the inclined part of the outer surface of the pin has a convex profile portion having a curvature that decreases in a direction from the open end toward a bottom of the cam slot when seen in the cross-section. This ensures that a force for urging the pin into the cam slot is produced when the pin of one panel is brought into contact with the edge of the cam slot of the adjoining panel in the sunshade closing operation.

Also preferably, an edge of the open end of the cam slot of the other of the adjacent sunshade panels that is away from the pin of the one of the adjacent sunshade panels when the adjacent sunshade panels are in the stacked state protrudes at least partially into a traveling path taken by the pin when the adjacent sunshade panels are slidably moved relative to each other from the stacked state to the state where the adjacent sunshade panels are arranged one next to the other in a sunshade closing operation. In this way, the edge of the open end of the cam slot of one panel can reliably contact the pin of the adjoining panel in the sunshade closing operation.

BRIEF DESCRIPTION OF THE FIGURES

Now the present invention is described in the following with reference to the appended drawings, in which.

DETAILED DESCRIPTION OF THE INVENTION

Now, embodiments of the present invention are described in the following with reference to the drawings.

Figure 1:
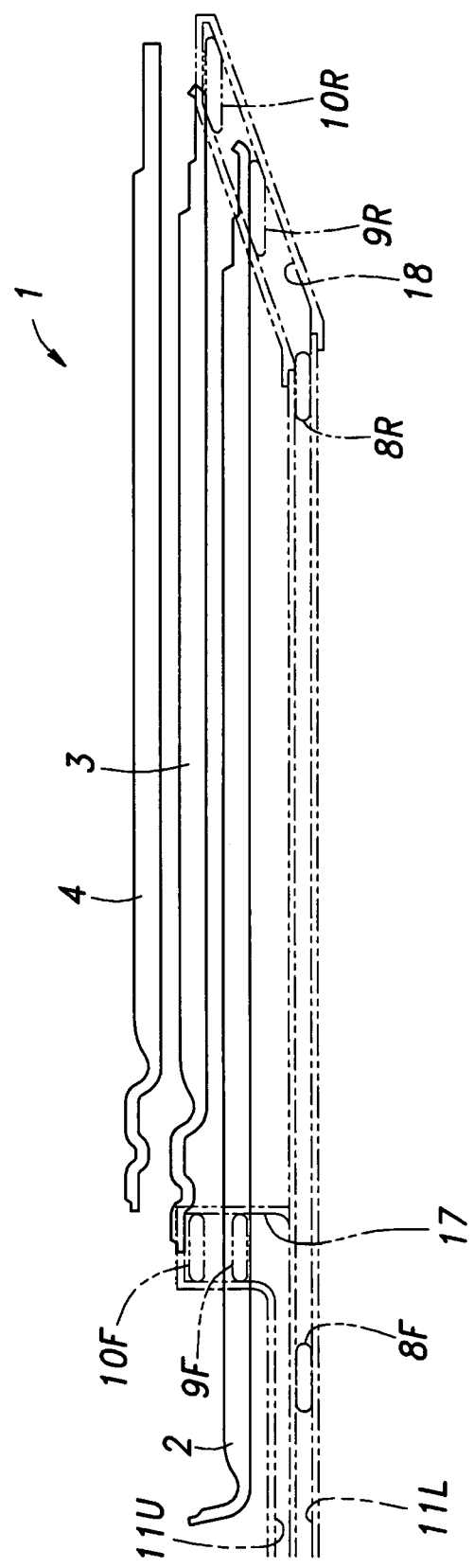
FIG. 1 is a schematic side view of an embodiment of the sunshade device according to the present invention seen from the center of the vehicle body.
Figure 2:
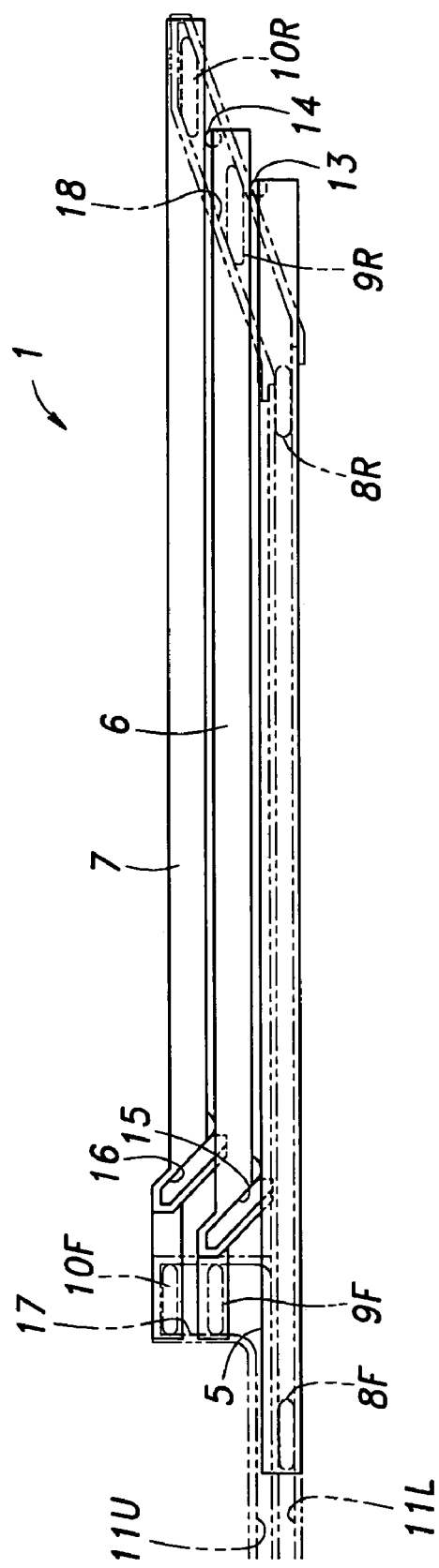
FIG. 2 is a schematic side view of the embodiment of the sunshade device according to the present invention seen from the center of the vehicle body.

FIGS. 1 and 2 are schematic side views showing a multi-panel sunshade device according to the present invention seen from a center of the vehicle. This sunshade device 1 comprises three sunshade panels (front panel 2, middle panel 3 and rear panel 4) for selectively opening and closing an opening (not shown in the drawings) defined in an inner roof of the vehicle. Though not specifically shown in the drawings, the roof opening may be of a rectangular shape that is relatively long in a fore-and-aft direction of the vehicle, and the opening can be fully closed when the three sunshade panels 2, 3, 4 are arranged one next to the other in the longitudinal direction (fore-and-aft direction of the vehicle), while the opening is fully opened when the sunshade panels are stacked one over the other in a rear portion of the vehicle. These two states can be achieved by slidably moving each sunshade panel 2, 3, 4, and in the illustrated embodiments, the direction of sliding corresponds to the fore-and-aft direction of the vehicle. However, the panel sliding direction may not be limited to the fore-and-aft direction of the vehicle and may be in the lateral direction (right-and-left direction) or up-and-down direction. The number of the sunshade also does not have to be limited to three but may be two or more than three.

The three sunshade panels 2, 3, 4 of the illustrated embodiment are supported by associated pair of right and left stays 5, 6, 7 on their lateral side edges. Each of the stays 5, 6, 7 has a substantially square bar shape elongated in the fore-and-aft direction and is provided with a pair of slide shoes 8F, 8R, 9F, 9R, 10F, 10R at its fore and rear portions on the lateral side, where the slide shoes 8F, 8R, 9F, 9R, 10F, 10R protrude outward and slidably engage later-described guide rails so that the stays 5, 6, 7 can slidably move in the fore-and-aft direction. It should be noted that the stays are omitted in FIG. 1 while the panels are omitted in FIG. 2.

Figure 3:
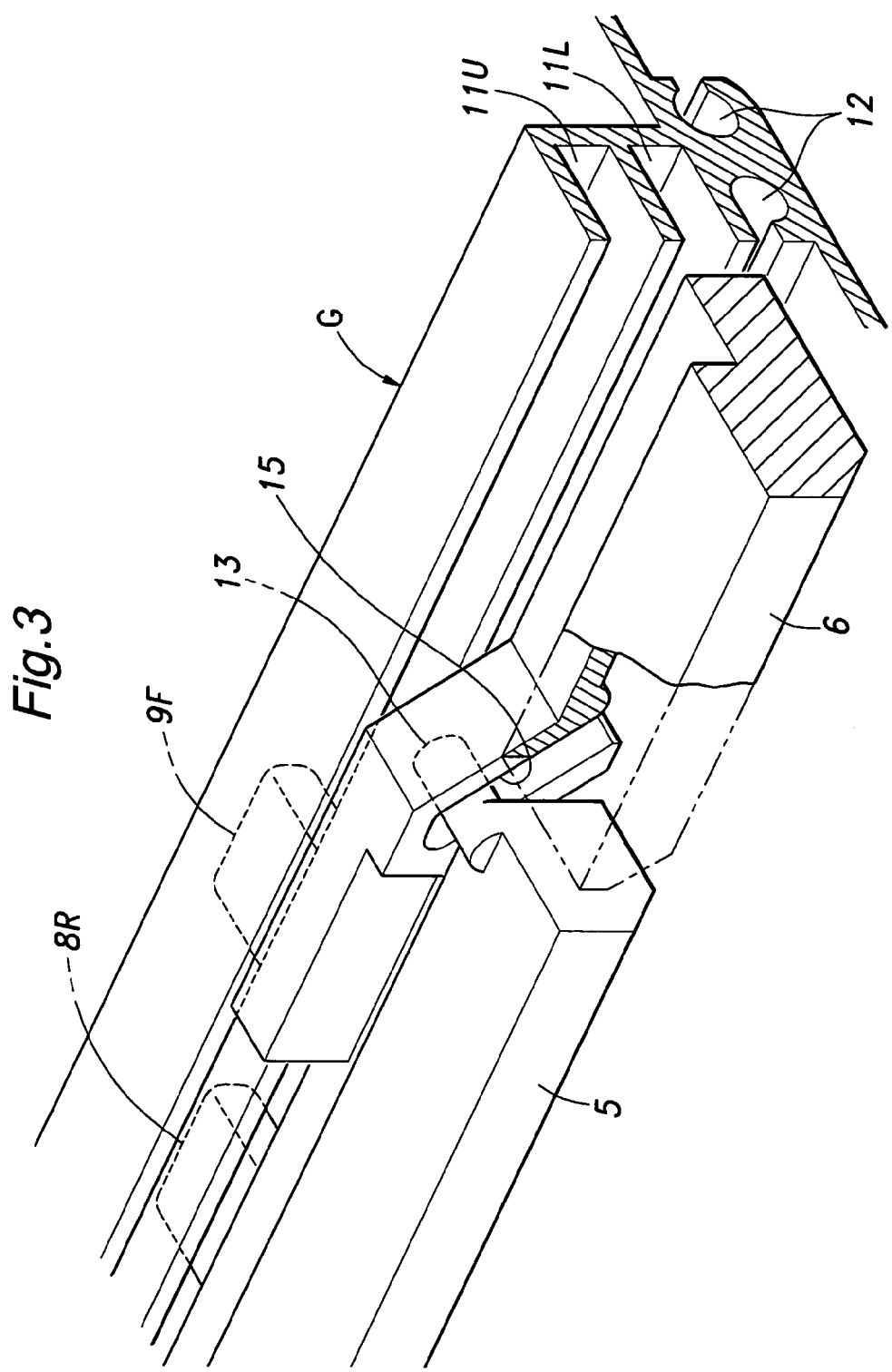
FIG. 3 is a perspective view of an essential part of the sunshade device according to the present invention seen from a point above a vehicle roof opening.

As shown in FIG. 3, the right and left guide rails G for slidably supporting the slides shoes 8F, 8R, 9F, 9R, 10F, 10R each have an upper guide rail 11U and a lower guide rail 11L each having a cross-section of a shape "[" with the opening facing inward and formed with a cable guide groove 12 having a cross-section of a shape of letter "C", through which is past a push/pull cable (not shown in the drawings) driven by an electric motor. Such a guide rail G can be formed by means of extrusion of an aluminum alloy, for example.

The front and rear slide shoes 8F and 8R provided at the front and rear end portions of the front panel stay 5 are both slidably engaged with a lower guide rail 11L. The push/pull cable not shown in the drawings is connected to the front panel stay 5 to convey a driving force for moving the stay 5 forwardly and rearwardly. In other words, the front panel 2 supported by the front panel stays 5 is constructed to serve as a drive panel.

The front slide shoes 9F, 10F provided to the front end portions of the middle and rear panel stays 6, 7, respectively, are both slidably engaged with an upper guide rail 11U. The rear slide shoes 9R, 10R provided to the rear end portions of the middle and rear panel stays 6, 7, respectively, are both slidably engaged with the lower guide rail 11L. Further, pins 13, 14 are integrally provided to the rear end portions of the front and middle panel stays 5, 6 (specifically, on a rear side of the corresponding rear slide shoes 8R, 9R), respectively, where the pins 13, 14 protrude outward with respect to the roof opening, i.e., pointing toward the guide rails G.

Further, cam slots 15, 16 having a surface extending obliquely upward in the forward direction and an open lower end facing in the rearward direction are formed on the inner sides of the middle and rear panel stays 6, 7 on a rear side of the associated front slide shoes 9F, 10F, respectively, so that the cam slots 15, 16 can engage the corresponding pins 13, 14 provided in the rear end portions of the front and rear panel stays 5, 6, respectively. The cam slots 15, 16 may or may not extend over an entire width (or lateral size) of the middle and rear panel stays 6, 7, respectively. The pins 13, 14 and the cam slots 15, 16 constitute a panel engagement/disengagement mechanism (or panel linkage mechanism) for linking the fore-and-aft adjoining panels in sliding movements. As mentioned above, the front panel stays 5 are driven forward or backward by the push/pull cables. In the sunshade closing operation, the front panel 2 supported by the front panel stays 5 is moved in the forward direction and the middle panel 3 is linked to the front panel 2 to follow the front panel 2, and in this situation, the front panel 2 serves as a preceding panel and the middle panel 3 serves as a following panel. Subsequently, the rear panel 4 is linked to the middle panel 3 to follow the middle panel 3. In this situation, the middle panel 3 serves as a preceding panel and the rear panel 4 serves as a following panel. Thus, the middle and rear panels 3, 4 follow the movement of the front panel 2 directly or indirectly, and serve as following panels. This also applies to the panel opening operation except that the front panel 2 provides the force pushing the middle and rear panels 3, 4 in the rearward direction.

Each upper guide rail 11U has a shorter length than the lower guide rail 11L to an amount roughly corresponding to the distance between the front slide shoes 9F, 10F and the rear slide shoes 9R, 10R of the middle and rear panel stays 6, 7, and the rear end of each upper guide rail 11U is connected to a front slide shoe storing room 17 that can accommodate therein the front slide shoes 9F, 10F of the middle and rear stays 6, 7. The front slide shoe storing room 17 is formed so as to extend upwardly in a vertical direction and in such a way that the front slide shoes 9F, 10F can move between the front slide shoe storing room 17 and the upper guide rail 11U. Further, connected to the rear end of each lower guide rail 11L is a rear slide shoe storing room 18 that can accommodate therein the rear slide shoes 9R, 10R of the middle and rear stays 6, 7. The rear slide shoe storing room 18 is formed so as to extend obliquely upward in a rearward direction (i.e., in a fully opening direction) and in such a way that the rear slide shoes 9R, 10R can move between the rear slide shoe storing room 18 and the lower guide rail 11L.

Figure 4:
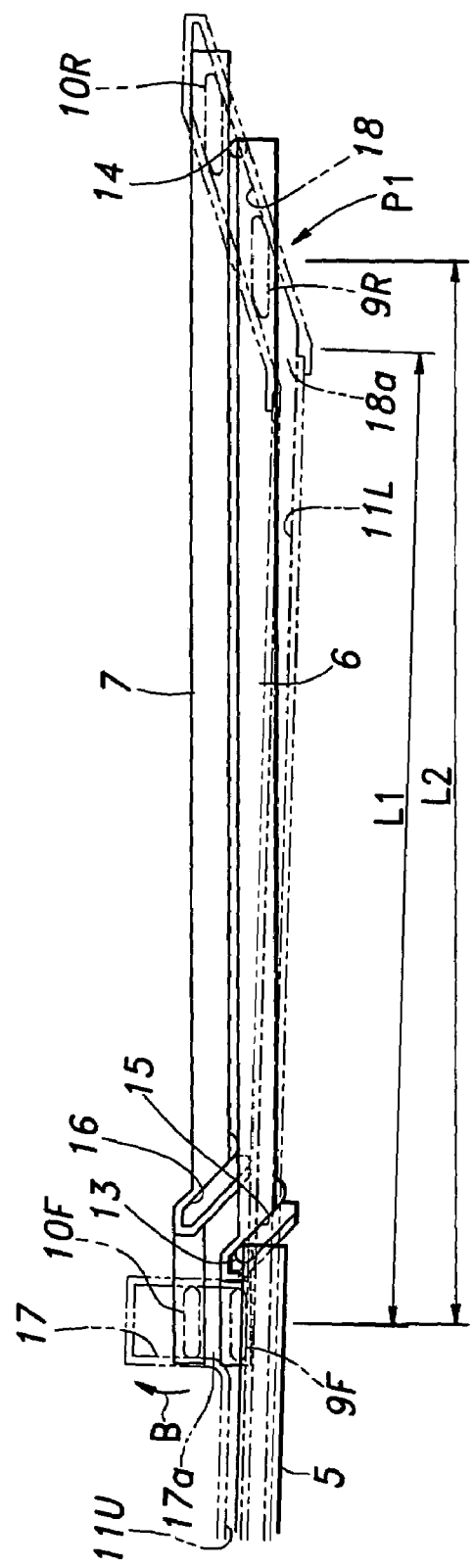
FIG. 4 is a schematic side view for explaining an operation of the sunshade device according to the present invention.
Figure 5:
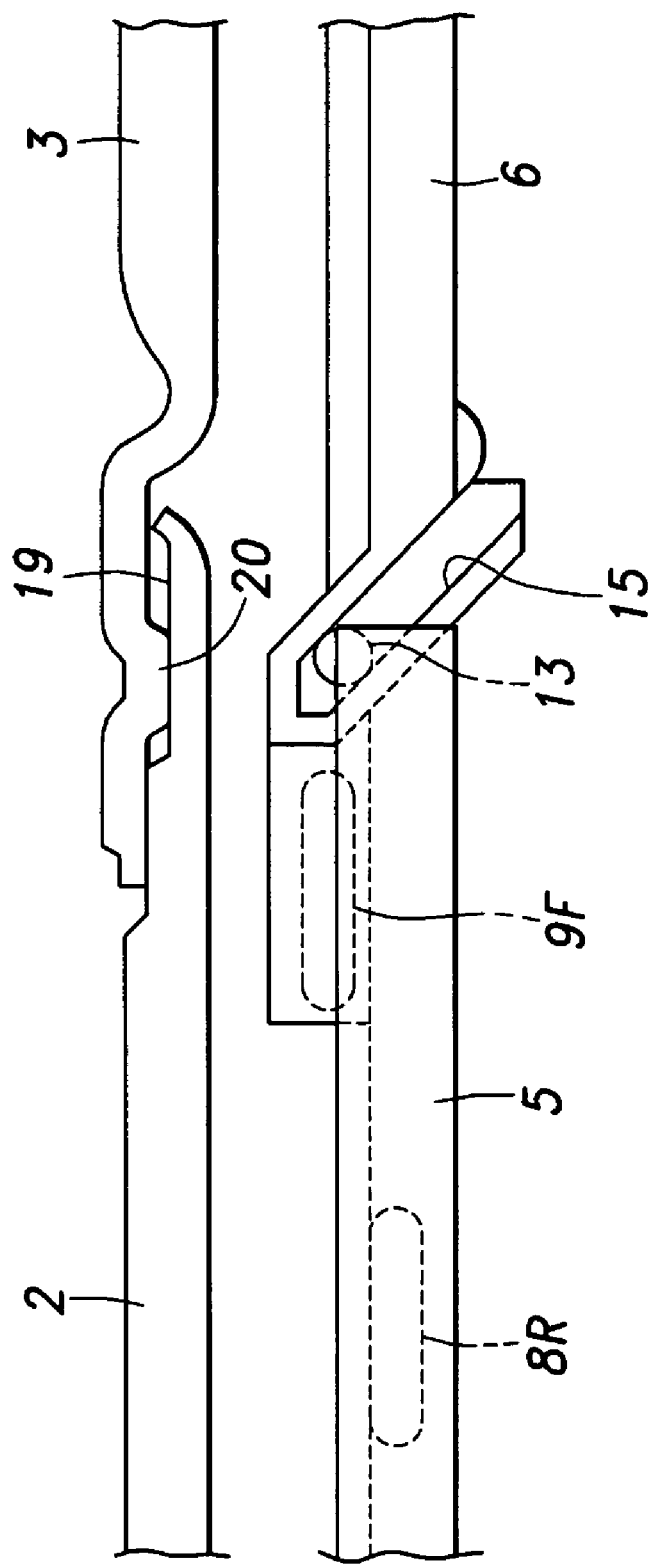
FIG. 5 is an enlarged side view of an essential part of the sunshade panels in the closed state.
Figure 6:
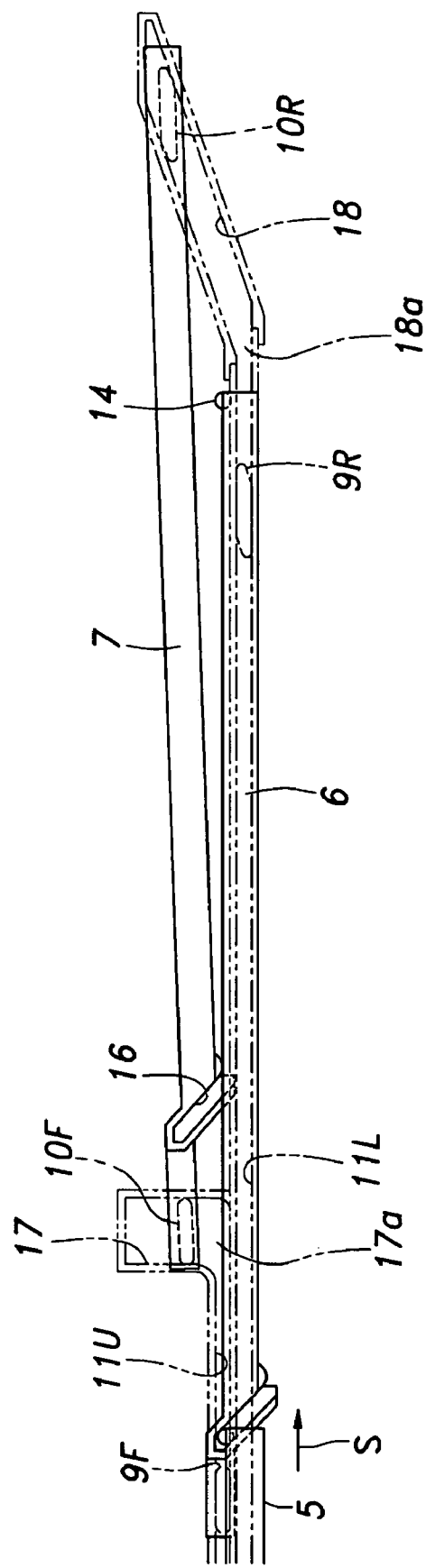
FIG. 6 is a schematic side view for explaining an operation of the sunshade device according to the present invention.

Now, the mode of operation of the illustrated sunshade device of the present invention is described with additional reference to FIGS. 4-6. As shown in FIGS. 1 and 2, the three panels 2, 3, 4 are stacked one over the other in the stored position where the sunshade device 1 is in the fully open state. In this state, the front slide shoe 8F and the rear slide shoe 8R of the front panel stay 5 are both in slidable engagement with the lower guide rail 11L. The front slide shoes 9F, 10F of the middle and rear panel stays 6, 7 are both in engagement with the front slide shoe storing room 17 that is integrally connected to the rear end of the upper guide rail 11U, while the rear slide shoes 9R, 10R of the middle and rear panel stays 6, 7 are both in engagement with the rear slide shoe storing room 18 that is integrally connected to the rear end of the lower guide rail 11L When closing the sunshade device 1 from the fully open position shown in FIGS. 1 and 2, the push/pull cable connected to a front end portion of the front panel stay 5 is pushed forward to move forward the front panel stay 5 having the front and rear slide shoes 8F, 8R slidably supported by the lower guide rail 11L. This causes the front panel 2 supported by the front panel stay 5 to move forward.

As the front panel stay 5 continues to advance, the pin 13 projecting outward from the rear end portion of the front panel stay 5 comes to engage the cam slot 15 formed in the front end portion of the middle panel stay 6 (see FIG. 4). Then, as the pin 13 of the front panel stay 5 moves horizontally along the lower guide rail 11L, because the cam slot 15 of the middle panel stay 6 defines a surface extending obliquely upward in the forward direction and the fore-and-aft movements of the front slide shoe 9F that is unitary with the cam slot 15 are regulated by front and rear vertical walls of the front slide shoe storing room 17, the front slide shoe 9F is pulled down inside the front slide shoe storing room 17. As a result, the front end portion of the middle panel stay 6 is lowered as the pin 13 of the front panel stay 5 moves forward.

Because the lower end of the front slide shoe storing room 17 is connected to the upper guide rail 11U, the front slide shoe 9F of the middle panel stay 6 moving downward in the front slide shoe storing room 17 enters the upper guide rail 11U. Then, as the front panel stay 5 continues to move forward while keeping the engagement between the pin 13 and the cam slot 15, the front slide shoe 9F begins to move forward along the upper guide rail 11U. As the middle panel stay 6 advances forward, the rear slide shoe 9R of the middle panel stay 6 slides down along the surface of the rear slide shoe storing room 18 that extends obliquely downward in the forward direction, and then enters the lower guide rail 11L so that the middle panel stay 6 and the middle panel 3 supported by the same continue to move forward together with the front panel stay 5 and the front panel 2.

In this state, as shown in FIG. 5, the rear end portion of the front panel 2 and the front end portion of the middle panel 3, which are given a smaller thickness than the main body of the panels, overlap each other. In the illustrated embodiment, the front end portion of the middle panel 3 is positioned over the rear end portion of the front panel 2 in such a manner that a protruding portion 20 formed on an underside of the front end portion of the middle panel 3 abuts a bottom of a recessed portion 19 formed on an upper surface of the rear end portion of the front panel 2. The depth of the recessed portion 19 and the amount of protrusion of the protruding portion 20 are properly selected such that the under surfaces of these panels 2, 3 extend in a substantially same plane to form a substantially continuous flat surface in the engagement state where the protruding portion 20 abuts the bottom of the recess 19. It should be mentioned that FIG. 5 is a side view showing a panel linkage portion seen from the center of the vehicle in a state when the panels are closed (or arranged one next to the other along the guide rails)

As the front panel stay 5 and the front panel 2 continue to move forward, the pin 14 provided to the rear end portion of the middle panel stay 6 enters the cam slot 16 formed in the front end portion of the rear panel stay 7, liking the middle panel stay 6 to the rear panel stay 7, and the middle panel 3 and the rear panel 4 move forward together with the middle panel 3 serving as a preceding panel and the rear panel 4 serving as a following panel in a similar fashion as described above.

In this way, the three panels 2, 3, 4 move forward in a state that the panels 2, 3, 4 are arranged in a line in the fore-and-aft direction of the vehicle. When the panels 2, 3, 4 reach the fully closed position, the supply of driving force to the push/pull cable is terminated and the panels 2, 3, 4 stop at the fully closed position in a state that they are linked to each other. In this state, the under surfaces of the three panels 2, 3, 4 extend substantially in the same plane to form a substantially continuous flat surface.

When opening the sunshade device 1, the push/pull cable is driven rearward as opposed to the above described operation, and this causes the pin 13 at the rear end portion of the front panel stay 5 to abut a forward facing surface of the cam slot 15 formed in the front end portion of the middle panel stay 6 so that the middle panel stay 6 is pushed rearward by the front panel stay 5. Although this also produces a force urging the pin 13 of the front panel stay 5 to move out of the cam slot 15 of the middle panel stay 6 due to the inclined shape of the cam slot 15, such a movement of the pin 13 is prevented because the guide rails 11L, 11U regulate the movements of the slide shoes 8F, 8R, 9F, 9R of the front and middle panel stays 5, 6 to be only in the fore-and-aft direction of the vehicle. In a similar fashion, the pin 14 at the rear end portion of the middle panel stay 6 pushes the cam slot 16 formed in the front end portion of the rear panel stay 7 in the rearward direction. As a result, the three panels 2, 3, 4 move rearward in a line.

When the rear slide shoe 10R of the rear panel stay 7 reaches the entrance to the rear slide shoe storing room 18 that is continuously connected to the rear end of the lower guide rail 11L, the rear slide shoe 10R continues to move rearward to ascend along the oblique surface of the rear slide shoe storing room 18 and arrives at or near a rearmost end of the slope when a further rearward movement of the front slide shoe 10F of the rear panel stay 7 is prevented by the rear wall of the front slide shoe storing room 17 that is connected to the rear end of the upper guide rail 11U (i.e., the rear wall of the front slide shoe storing room 17 serves as a stopper). Then, with the further rearward movement of the front slide shoe 10F being prevented, the pin 14 of the middle panel stay 6 moves relative to the cam slot 16 of the rear panel stay 7, specifically from the bottom of the cam slot 16 toward the open lower end of the same, to push the front slide shoe 10F of the rear panel stay 7 upward into the front slide shoe storing room 17. In this way, the rear panel stay 7 and the rear panel 4 are moved upward. Further, the pin 14 of the middle panel stay 6 is released from the cam slot 16 of the front end portion of the rear panel stay 7, thereby allowing the rear slide shoe 9R of the middle panel stay 6 to continue to move rearward along the lower guide rail 11L. Then, the rear slide shoe 9R of the middle panel stay 6 also enters the rear slide shoe storing room 18 to be stored therein, and the middle panel 3 is overlappingly positioned under the rear panel 4 (i.e., the sunshade device returns to the state shown in FIG. 4 via the state shown in FIG. 6).

As the front panel 2 is further driven rearward, as in the same fashion as described above, the pin 13 of the rearward end portion of the front panel stay 5 relatively moves within the cam slot 15 of the front end portion of the middle panel stay 6 to push up the front slide shoe 9F at the front end portion of the middle panel stay 6 into the front slide shoe storing room 17, thereby lifting the middle panel 3. Then, the front panel 2 is moved rearward until it is ovelappingly placed under the middle panel 3 to achieve the fully open state (i.e., the sunshade device returns to the state shown in FIG. 2).

Thus, according to the illustrated embodiment of the present invention, the vertical walls of the front slide shoe storing room 17 regulate the fore-and-aft movements of the front slide shoes 9F, 10F of the middle and rear panels 3, 4 in the fully open state, to thereby prevent fore-and-aft rattling movements of the slide shoes. Further, the panels 2, 3, 4 are selectively linked and unlinked in the fore-and-aft direction by the engagement and disengagement of the pins 13, 14 to and from the cam slots 15, 16. Because the engagement and disengagement between the pins 13, 14 and cam slots 15, 16 are achieved by oblique movements of the panels 2, 3, 4 with respect to the sliding movements thereof, the sound generated at the engagement and disengagement can be considerably reduced or eliminated and it is possible to achieve smooth and quiet panel opening and closing operations. Particularly, it will be preferable if there is provided means for urging downward the middle and rear panels 3, 4 in the stored position to thereby ensure that the panels stacked one over the other in the stored position do not unfavorably vibrate in vertical directions to make clattering sounds.

It should be noted that the linkage mechanism for engaging and disengaging the fore-and-aft adjoining panels may not be limited to the one comprising the pin and the cam slot, but may consist of a conventional one such as disclosed in JPA 5-24437 mentioned above. In the above embodiment, the front slide shoe storing room 17 is connected to the rear end of the upper guide rail 11U. However, because the limit to the rearward movement of the middle panel stay 6 and the rear panel stay 7 can be controlled by the length of the rear slide shoe storing room 18, the front slide shoe storing room 17 does not necessarily have to be connected to the rear end of the upper guide rail 11U, and the upper guide rail 11U may extend rearward beyond the entrance (or connection point) to the front slide shoe storing room 17.

Figure 7:
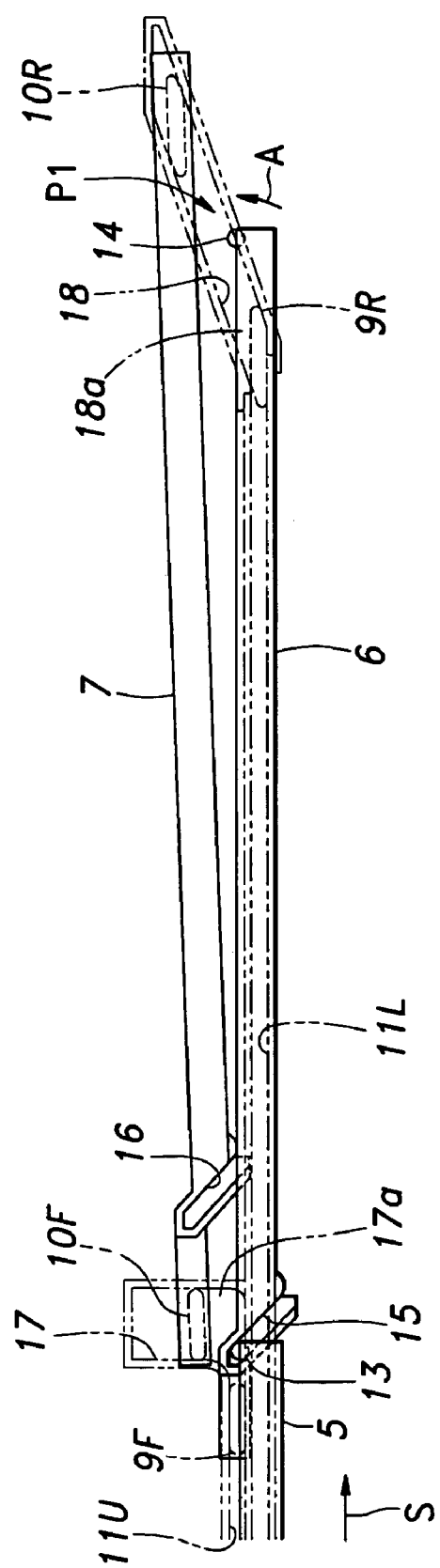
FIG. 7 is a view showing a middle panel stay according to the present invention in an initial phase of a panel-storing operation.
Figure 8:
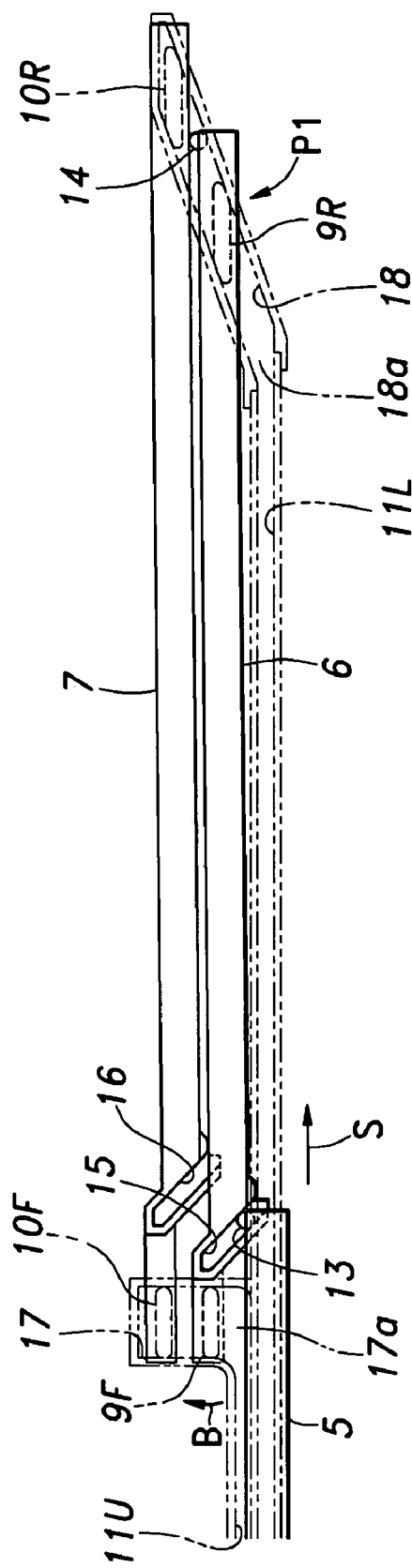
FIG. 8 is a view showing the middle panel stay according to the present invention in al last phase of a panel-storing operation.

Next, taking the middle panel stay 6 (middle panel 3) as an example, the operations for moving the follower panels to the stored position according to a preferred embodiment of the present invention are explained more in detail with reference to FIGS. 7 and 8 as well as FIG. 4. In the state shown in FIG. 6, the middle panel stay 6 is linked to the front panel stay 5, and the rear slide shoe 9R of the middle panel stay 6 is yet to reach a connection point 18a between the rear slide shoe and the lower guide rail 11L. From this state, as the middle panel stay 6 is caused to slide toward the fully open position by the front panel stay 5 driven toward the fully open position as indicated by an arrow S in FIG. 6, the rear slide shoe 9R reaches the connection point 18a at which the rear slide shoe 9R is ready to enter the rear slide shoe storing room 18, as shown in FIG. 7 (Thus, the connection point 18a serves as an entrance to the rear slide shoe storing room 18).

When the rear slide shoe 9R reaches the connection point 18a and is ready to enter the rear slide shoe storing room 18, the front slide shoe 9F is still received in the upper guide rail 11U and guided so as to slide along the same. This is because the space (distance) L1 from the connection point 17a between the front slide shoe storing room 17 and the upper guide rail 11U to the connection point 18a between the rear slide shoe storing room 18 and the lower guide rail 11L is set shorter than the space (distance) L2 between the front and rear slide shoes 9F, 9R.

Thus, as the middle panel stay 6 (middle panel 3) is pushed further and the rear slide shoe 9R moves into the rear slide shoe storing room 18, the middle panel stay 6 undergoes a pivoting movement in that the rear slide shoe 9R rotates generally upward in the drawing about the front slide shoe 9F (arrow A in FIG. 7). It should be noted that the slidable engagement between the front slide shoe 9F and the upper guide rail 11U, particularly in a direction vertical to the sliding movement, is adjusted to have a certain play that allows the above pivoting movement while minimizing or preventing clattering sounds caused by the play. In this way, although the front slide shoe has a plate-like shape elongated in the sliding direction, a smooth pivoting movement can be achieved. However, in the case where the front and rear slide shoes have a pin-shape having a circular cross-section, such a play may not be necessary and the play may be on the order of the dimensional tolerance of the slidably engaging members.

The above pivoting movement continues until the front slide shoe 9F arrives at the connection point 17a between the front slide shoe storing room 17 and the upper guide rail 11U and the rear slide shoe 9R moves to a predetermined position P1 in the rear slide shoe storing room 18, as shown in FIG. 4.

It should be noted that the predetermined position P1 in the rear slide shoe storing room 18 may be defined as a position of the rear slide shoe 9R in the rear slide shoe storing room 18 when the top surface of the pin 14 of the middle panel stay 6 abuts the underside of the already-stored rear panel stay 7. It should be also mentioned that although not described above, a predetermined position for the rear panel 4 can be defined in a similar manner as for the middle panel 3, i.e., it can be defined as a position of the rear slide shoe 10R in the rear slide shoe storing room 18 when the front slide shoe 10F has reached the entrance 17a to the front slide shoe storing room 17, as substantially shown in FIG. 6.

From the state when the front slide shoe 9F has reached the connection point 17a, as the front panel stay 5 slides further in the direction toward the fully open position as indicated by the arrow S in FIG. 8, the oblique cam slot 15 of the middle panel stay 6 is lifted as a result of the interaction with the pin 13 that moves in the sunshade-opening sliding direction, and this causes the front slide shoe 9F of the middle panel stay 6 to enter the front slide shoe storing room 17 as indicated by an arrow B in FIG. 8. Thus, along with this movement of the front slide shoe 9F, the middle panel stay 6 (middle panel 3) undergoes a pivoting movement about the rear front shoe 9R as indicated by the arrow B in FIG. 8 (FIG. 4).

In the illustrated embodiment, the wall surfaces of the front slide shoe storing room 17 facing in the direction of sliding movements (i.e., the mutually-facing inner surfaces of the front and rear walls) extend straight vertically in parallel to each other, and the rear slide shoe 9R moves within the rear slide shoe storing room 18 in response to the straight movements of the front slide shoe 9F, resulting in the pivoting movements of the middle panel stay 6 around the rear slide shoe 9R as explained above. It should be mentioned that the wall surfaces of the front slide shoe storing room 17 facing in the sliding directions may consist of arcuate surfaces that curve around the rear slide shoe 9R to facilitate the pivoting movements of the stay 6.

As described above, when the middle panel 3 moves to the storing position, first, the rear slide shoe 9R undergoes pivoting movements around the front slide shoe 9F to move to the predetermined position P1 within the rear slide shoe storing room 18 and thereafter, the front slide shoe 9F undergoes pivoting movements around the rear slide shoe 9R to enter the front slide shoe storing room 17. In this way, compared with an embodiment where the slide shoes 9F, 9R are simultaneously moved into the respective storing rooms 17, 18, the operation of moving the slide shoes 9F, 9R into the storing rooms 17, 18 can be conducted in order and thus the slide shoes can be stored reliably.

Particularly, the distance between the front and rear slide shoes 9F, 9R and the distance between the entrances 17a, 18a to the front and rear slide shoe storing rooms 17, 18 can be preferably determined in such a manner that the front slide shoe 9F is positioned at the entrance 17a to the front slide shoe storing room 17 when the rear slide shoe 9R reaches the predetermined position within the rear slide shoe storing room 18. In this way, the operation for storing the slide shoes 9F, 9R into the storing rooms 17, 18, respectively, can be achieved reliably according to the designed sequence.

It should be noted that though the above explanation was made to the middle panel stay 6 (middle panel 3), the same can be applied to the rear panel stay 7 (rear panel 4), and there will be no problem to operate the panels as described above even in the structure having four sunshade panels or more. It should be also mentioned that the front panel 2 (front panel stay 5), which serves as a drive panel, can be simply positioned below the follower panels (3, 4) in the stored state as shown in FIGS. 1 and 2, and thus there is no need to conduct an operation for moving the front and rear shoes of the front panel 2 into the front and rear shoe storing rooms 17, 18.

Next, an explanation is made to the preferred structure of the linkage mechanism in the multi-panel sunshade device according to the present invention. As described above, the linkage between the sunshade panels 2, 3, 4 can be achieved by the engagement between the pins 13, 14 and the cam slots 15, 16 provided to the stays 5, 6, 7 for supporting the panels 2, 3, 4. The linkage is released in the panel-stored state (or fully open state) and therefore, in the sunshade closing operation it is necessary to reliably achieve the linkage between the preceding and following panels. Because the pin 14 and the cam slot 16 are substantially identical with the pin 13 and the cam slot 15, respectively, the following explanation is made to the pin 13 and the cam slot 15.

Figure 9:
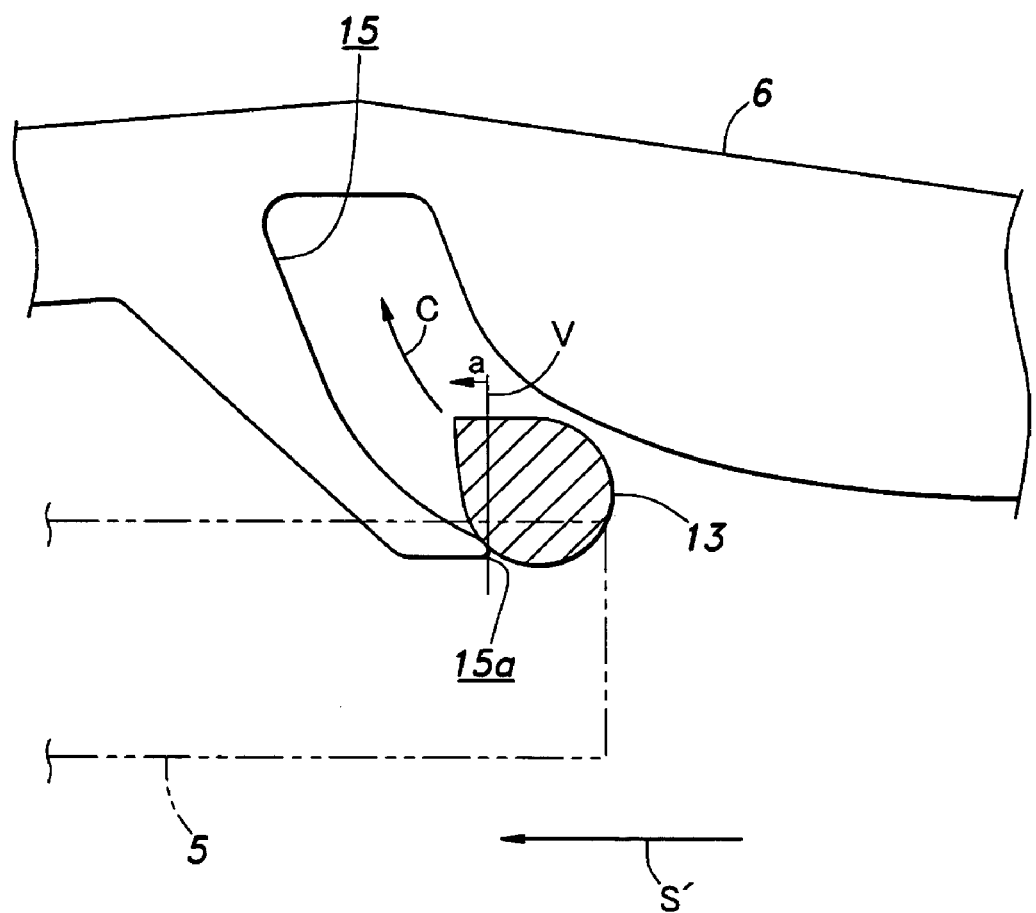
FIG. 9 is an enlarged side view of an essential part of the sunshade device showing the pin and cam slot according to the present invention.

As shown in FIG. 9, the cross-section of the pin 13 taken along a sunshade-closing sliding direction S' (the direction in which the panels 2, 3, 4 slide to close the roof opening) has a shape of a droplet having a pointed end directed toward the inside of the cam slot 15. The pin 13 may have a general shape of a rod extending in the direction normal to the face of the sheet of drawing in a similar fashion as in the above shown embodiment. The cam slot 15 is formed so that the inclination angle of the cam slot 15 with respect to the sunshade-closing sliding direction S' increases from the open end of the cam slot 15 toward the bottom of the cam slot 15. This can minimize the distance that the preceding panel is required to slide over to draw the following panel out of the stored position, and thus achieving a compact sunshade device 1.

FIG. 9 shows a state where the front panel 2 has slid toward the fully closed position to such an extent that the pin 13, which is integral with the front panel 2, is in contact with an edge 15a of the open end of the cam slot 15 that is integral with the middle panel 3. The cam 15 provides mutually facing wall surfaces for guiding radially opposing sides of the pin 13, and each wall surface has an edge at the open end of the cam slot 15. The above edge 15a is the one that serves to guide the pin 13 toward inside of the cam slot 15, i.e., the one more distant from the bottom of the cam slot 15 in the vertical direction.

As shown in FIG. 9, a portion of the pin 13 projects in the sunshade-closing sliding direction S' from a vertical line V that passes trough a contact point between the pin 13 and the edge 15a and is at a normal angle with respect to the sunshade-closing sliding direction S', and an amount "a" of the projection of the pin 13 increases toward the bottom of the cam slot 15. In other words, a part of an outer surface of the pin 13 that faces toward the cam slot 15 is inclined with respect to the vertical line V in such a manner that at least a portion of the pin 13 projects into the cam slot 15 when the outer surface of the pin 13 abuts the edge 15a of the cam slot 15 in a sunshade closing operation, and the inclined part of the outer surface of the pin 13 extends in a vertical direction more than half of a height of the pin 13. More particularly, the inclined part of the outer surface of the pin 13 has a convex profile portion having a curvature that decreases in a direction from the open end toward the bottom of the cam slot 15 when seen in the cross-section.

In this way, although the point of contact of the pin 13 with the edge 15a of the cam slot 15 can shift in a direction along the vertical line V due to manufacturing errors or assembly tolerances, it is ensured that the a portion of the pin 13 protrudes into the cam slot 15 in the sunshade-closing sliding direction S' when the inclined part of the outer surface of the pin 13 contacts the edge 15a of the cam slot 15. Thus, as the panel 2 continues to slide in the sunshade-closing direction S', the pin 13 can be urged toward inside of the cam slot 15 as indicated by the arrow C. Thus, the pin 13 and the cam slot 15 can be reliably engaged to each other.

It should be mentioned that the illustrated shape of the pin 13 is just an example, and the shape of the pin 13 for ensuring the projection in the sunshade-closing sliding direction S' may not be limited to the illustrated embodiment.

Figure 10:
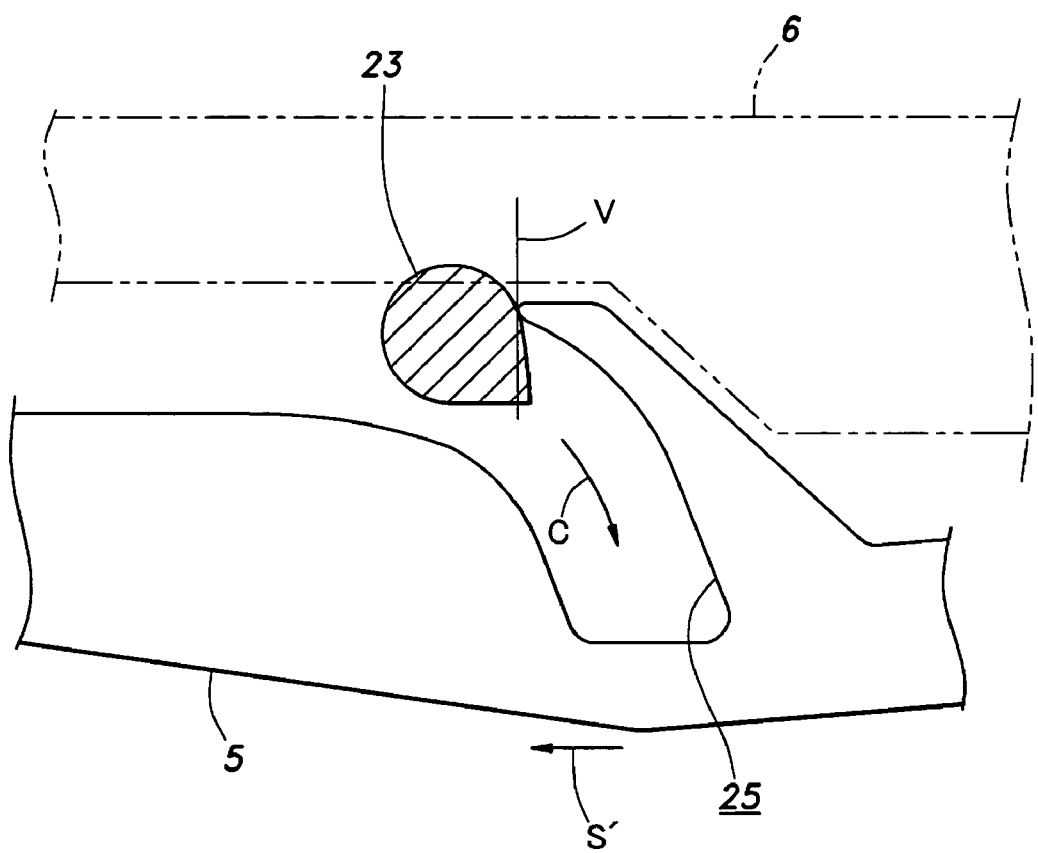
FIG. 10 is a view similar to FIG. 9 showing another embodiment according to the present invention.

Is should be also mentioned that the relationship between the pin 13 and the cam slot 15 may not be limited to the above embodiment. For example, as shown in FIG. 10, an inclined cam slot 25 similar to the above may be provided to the rear end portion of the preceding panel (e.g., stay 5 of the front panel 2), while a pin 23 similar to the above may be provided to the front end portion of the following panel (e.g., stay 6 of the middle panel 3). In such a structure also, the engagement and disengagement of the adjoining panels can be achieved and the similar effects can be obtained, except that the directions of displacement of the pin 23 and the cam slot 25 are inverted from the above embodiment.

Although the present invention has been described in terms of preferred embodiments thereof, it is obvious to a person skilled in the art that various alterations and modifications are possible without departing from the scope of the present invention which is set forth in the appended claims.

What is claimed is:

1. A multi-panel sunshade device for selectively opening and closing an opening defined in a roof of a vehicle, comprising:
   a pair of right and left guide rails extending along either side of the roof opening, the guide rails each having a front end and a rear end;
   a plurality of sunshade panels slidably supported between the pair of right and left guide rails, the plurality of sunshade panels comprising a drive panel that is driven by a power source and at least one follower panel that can be caused to move by movement of the drive panel; and
   a panel storage room provided in a rear end portion of the right and left guide rails to store the plurality of sunshade panels in a stacked state when the sunshade panels are in a fully open position; and
   a panel linkage mechanism provided between adjacent sunshade panels for linking the adjacent sunshade panels to each other when the plurality of sunshade panels are slidably moved forward from the fully open position to a fully closed position where the plurality of sunshade panels are arranged one next to the other along the guide rails to form a substantially flat inner surface, wherein the drive panel consists of a forefront one of the sunshade panels that is positioned most distant from the panel storage room when the plurality of sunshade panels are in the fully closed position, and in the fully open position, the plurality of sunshade panels are stacked with the forefront sunshade panel being positioned at a bottom and a rearmost sunshade panel being at a top,
   wherein each of the plurality of sunshade panels are provided with a pair of right and left front slide shoes and a pair of right and left rear slide shoes, and wherein each of the pair of right and left guide rails comprises an upper guide rail and a lower guide rail and the right and left front slide shoes of the at least one follower panel are supported by the right and left upper guide rails, respectively, while the right and left rear slide shoes of the at least one follower panel are supported by the right and left lower guide rails, respectively,
   the multi-panel sunshade device further comprising:
   a pair of right and left front slide shoe storing rooms connected to the right and left upper guide rails, respectively, so that the right and left front slide shoes of the at least one follower panel can move between the right and left upper guide rails and the right and left front slide shoe storing rooms, respectively; and
   a pair of right and left rear slide shoe storing rooms connected to the right and left lower guide rails, respectively, so that the right and left rear slide shoes of the at least one follower panel can move between the right and left lower guide rails and the right and left rear slide shoe storing rooms, respectively.

2. The multi-panel sunshade device according to claim 1, wherein each of the right and left rear slide shoe storing rooms is connected to a rear end of the corresponding lower guide rail.

3. The multi-panel sunshade device according to claim 1, further comprising a stopper member for, when each of the right and left front slide shoes of the at least one follower panel reaches an entrance to the corresponding front slide shoe storing room in a sunshade opening operation, preventing further sliding movement of the front slide shoes of the at least one follower panel.

4. The multi-panel sunshade device according to claim 3, wherein each of the right and left front slide shoe storing rooms is connected to a rear end of the corresponding upper guide rail.

5. The multi-panel sunshade device according to claim 1, wherein the pair of right and left rear slide shoe storing rooms extend obliquely upward in a rearward direction from the rear end of the right and left lower guide rails, respectively.

6. The multi-panel sunshade device according to claim 5, wherein a distance between the front slide shoes and the rear slide shoes of each follower panel is greater than a distance between entrances to the front slide shoe storing rooms and entrances to the rear shoe storing rooms, whereby when the right and left front slide shoes of each follower panel reach the entrances to the corresponding front slide shoe storing rooms in a sunshade opening operation, the right and left rear slide shoes of the follower panel have entered into the corresponding rear slide shoe storing rooms.

7. The multi-panel sunshade device according to claim 6, wherein the right and left front slide shoes of each follower panel are slidably supported by the corresponding upper guide rails with such a play that allows each follower sunshade panel to pivot around the front slide shoes when the right and left rear slide shoes enter the corresponding rear slide shoe storing rooms while the right and left front slide shoes are still guided by the upper guide rails in the sunshade opening operation.

8. The multi-panel sunshade device according to claim 6, wherein each front slide shoe storing room extends vertically upward from the corresponding upper guide rail, and different follower sunshade panels have different distances between the front and rear slide shoes.

9. The multi-panel sunshade device according to claim 1, wherein the panel linkage mechanism comprises a laterally extending pin provided to one of the adjacent sunshade panels and a cam slot provided to the other of the adjacent sunshade panels, the cam slot extending obliquely in the direction of sliding movements of the sunshade panels and having an open end, and wherein when the adjacent sunshade panels are arranged one next to the other along the guide rails, the pin of the one of the adjacent sunshade panels is received in the cam slot of the other of the adjacent sunshade panels, and when the adjacent sunshade panels are in the stacked state, the pin of the one of the adjacent sunshade panels is released from the open end of the cam slot of the other of the adjacent sunshade panels to allow the adjacent sunshade panels to slidably move relative to each other.

10. The multi-panel sunshade device according to claim 9, wherein a part of an outer surface of the pin of the one of the adjacent sunshade panels that generally faces toward the cam slot of the other of the adjacent sunshade panels when the adjacent sunshade panels are in the stacked state is inclined with respect to a vertical direction when seen in a cross-section taken along a line parallel to the guide rails in such a manner that at least a portion of the pin has entered into the cam slot when the outer surface of the pin abuts an edge of the cam slot in a sunshade closing operation, wherein the inclined part of the outer surface of the pin extends in a vertical direction more than half of a height of the pin.

11. The multi-panel sunshade device according to claim 10, wherein the inclined part of the outer surface of the pin has a convex profile portion having a curvature that decreases in a direction from the open end toward a bottom of the cam slot when seen in the cross-section.

12. The multi-panel sunshade device according to claim 9, wherein an edge of the open end of the cam slot of the other of the adjacent sunshade panels that is away from the pin of the one of the adjacent sunshade panels when the adjacent sunshade panels are in the stacked state protrudes at least partially into a traveling path taken by the pin when the adjacent sunshade panels are slidably moved relative to each other from the stacked state to the state where the adjacent sunshade panels are arranged one next to the other in a sunshade closing operation.

\* \* \* \* \*